Jan. 2, 1934.  G. A. JULIUS ET AL  1,942,336
TOTALIZATOR ODDS INDICATOR REMOTE CONTROL MECHANISM
Filed Aug. 3, 1932  3 Sheets-Sheet 1

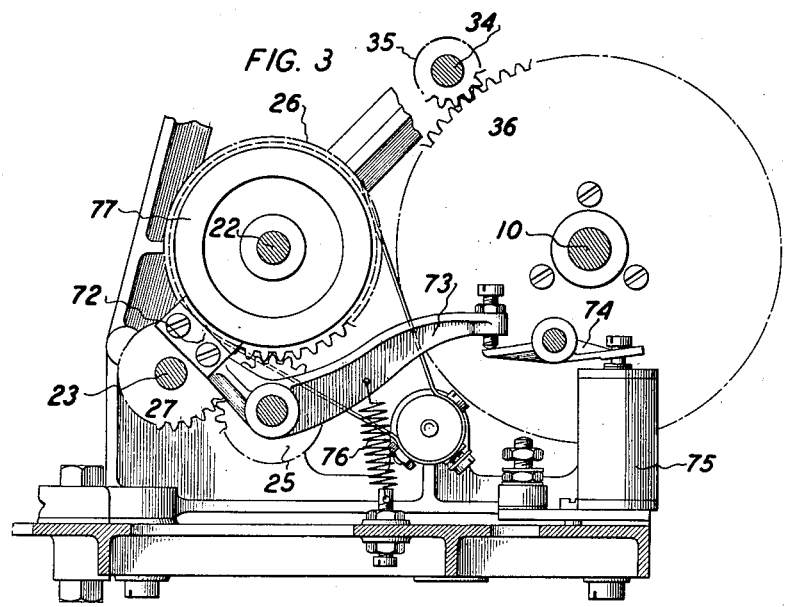
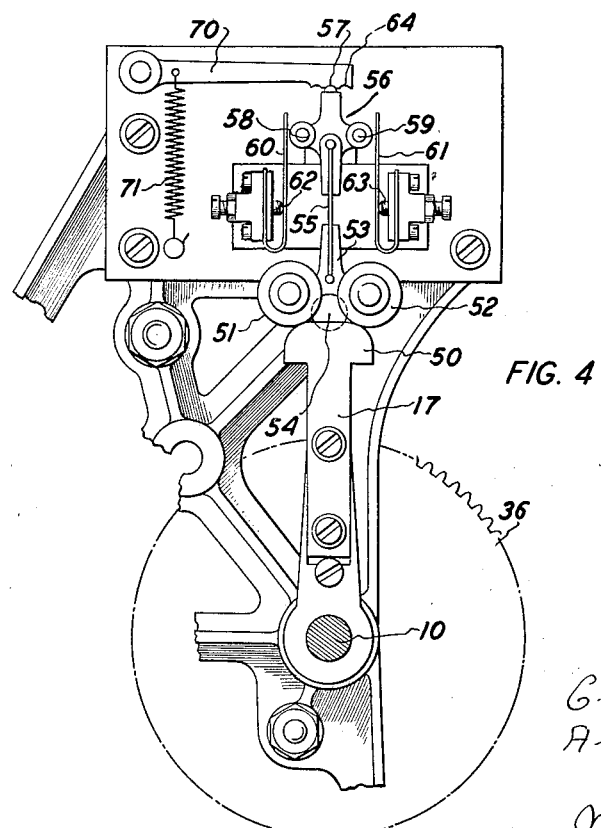

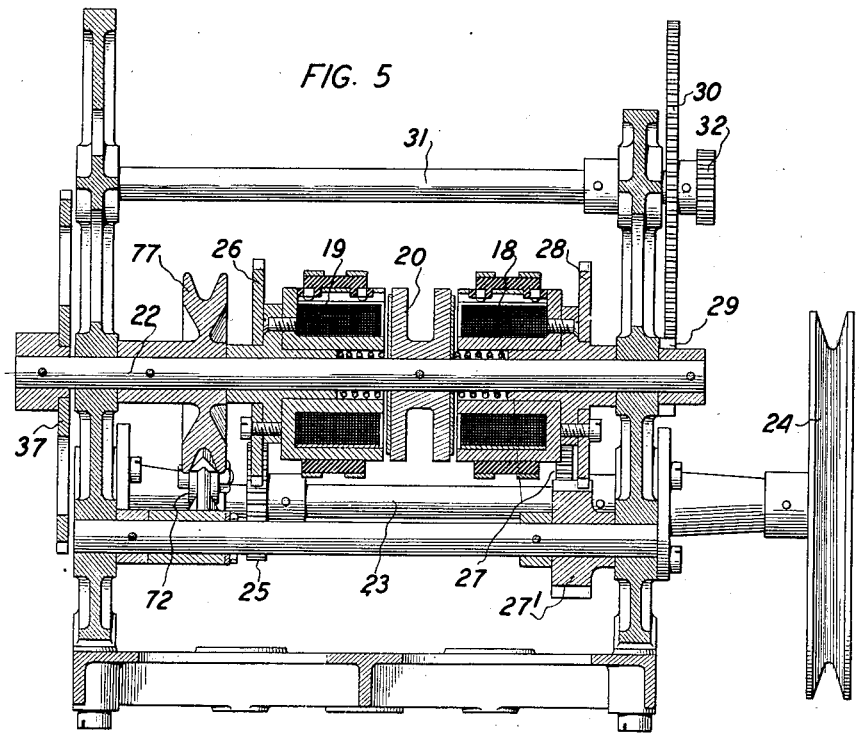

Patented Jan. 2, 1934

1,942,336

UNITED STATES PATENT OFFICE 1,942,336

TOTALIZATOR ODDS INDICATOR REMOTE CONTROL MECHANISM

George Alfred Julius and Awdry Francis Julius, Sydney, New South Wales, Australia Application August 3, 1932, Serial No. 627,372, and in Australia August 19, 1931

2 Claims. (Cl. 172—239)

In our co-pending United States application Serial No. 540,734 filed May 28, 1931 we have described and illustrated a device in which the ratio of two variable quantities is progressively computed mechanically and the ratio variations are translated into to-and-fro linear movements of a flexible line. These linear movements are transmitted to a central control station which includes a master indicator and a master self-synchronizing motor, and from this station a plurality of distant indicators is operated, each of them individually controlled by a self-synchronizing motor, all these self-synchronizing motors being electrically connected in series. Such apparatus is particularly adapted for use in connection with electric totalizators for displaying the "odds" for the respective competitors to the public progressively during the operation of the machine.

The present invention consists in improved means for operating the master indicator and the master self-synchronizing motor at the central control station by which the distant motors and indicators are controlled.

The present invention is illustrated in the accompanying drawings, in which:—

Figure 1:
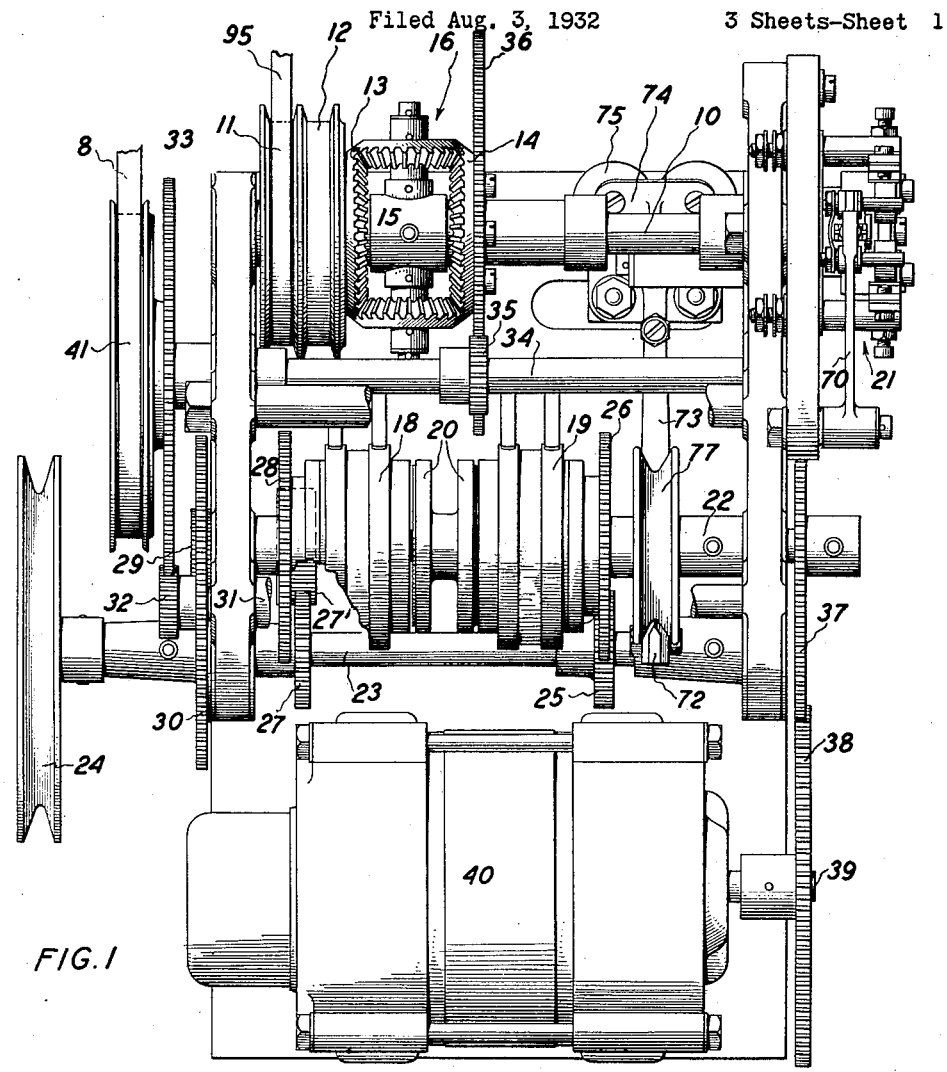
Figure 2:
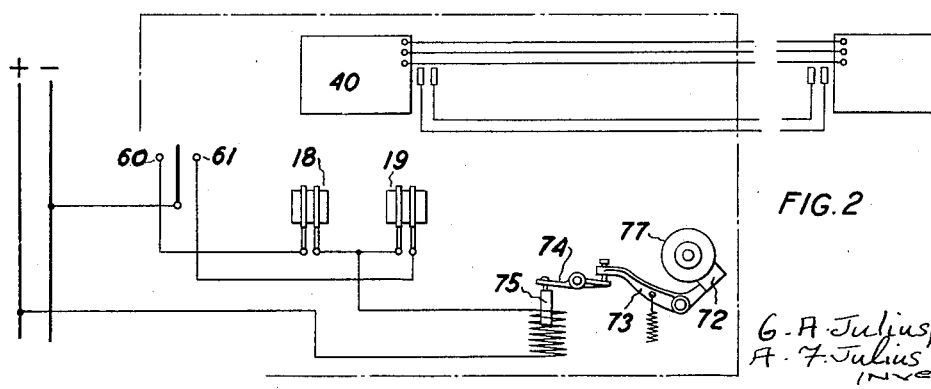

Fig. 1 is a plan view;

Fig. 2 a circuit wiring diagram;

Fig. 3 a fragmentary interior elevational view explanatory of the braking means and certain other parts of the mechanism which is shown in plan view in Fig. 1;

Fig. 4 is a fragmentary elevational view showing the detail of an electric switch which is shown also at the upper right hand portion of the assembly illustrated in Fig. 1; and Fig. 5 is a fragmentary sectional elevational view showing the detail construction of the magnetic clutch mechanism which is shown also in elevation in Fig. 1.

Upon a shaft 10 two coupled pulleys 11 and 12 are loosely mounted. On the pulley 11 is wound a flexible tape 95 from a ratio computer or other master apparatus as above described. The to-and-fro linear movements of this tape represent the changes taking place in the ratio which is to be indicated. On the pulley 12 is wound a flexible line carrying a weight (not shown) which tends to rotate the pulleys 11 and 12 so that the tape 95 will be in tension. The pulley 12 is fixed to the outer side of a sun wheel 13 of an epicyclic box 16. The wheel 13 runs freely on the shaft 10, as does its pair sun wheel 14, and the planet rotor 15 is keyed to the shaft 10. The function of this shaft is to oscillate a tappet arm 17 in correspondence with the to-and-fro linear movements of the tape 95 and thereby to operate switch mechanism 21 which is shown in Fig. 4. This switch mechanism controls transmission of current through two magnetic clutches 18 and 19.

When any movement of the tape 95, which is wound over the pulley 11, occurs, a corresponding movement of the planet rotor 15 in the epicyclic box 16 takes place and this movement is applied to the shaft 10. The planet rotor is caused to move because for the time being the sun wheel 14 is at rest. When the shaft 10 turns either negatively or positively according to the direction of movement of the tape 95, the tappet arm 17 is swung to the left or to the right as the case may be. The head of this arm is provided with a cam 50 and this cam coacts with two tappets 51—52 on the cross arms of a rocking member 53 which is oscillatable about a centre 54. The member 53 has fixed to it a piece of flat clock spring 55 which carries on the top end of it a cruciform striker piece 56. This striker piece carries two contact pins 58—59 which are insulated from it. It is also fitted with a ball latch 57 which makes frictional engagement in one or other of three notches in a latch plate 64, this latch plate being carried on the outer end of a light lever 70, which is constrained downwardly by a spring 71. The frictional engagement of the ball latch 57 in the notches of the latch plate 64 tends to impede movement of the piece 56. When the tappet 17 is moved to the left, the piece 56 is swung over to the right and the latch ball 57 is caused to jump from the centre notch into the right hand notch in the latch plate 64. The pin 59 then presses against a spring contact 61 and thus closes a circuit through the magnetic clutch 18. When the piece 17 is swung over to the right, the latch ball 57 is caused to jump into the left hand notch in the latch plate and the pin 58 then presses against a spring contact 60, thereby closing a circuit through the magnetic clutch 19. The springs 60 and 61 are adjustable by means of screws 62 and 63. As a result of this arrangement, when a left hand movement of the shaft 10 occurs, the clutch 18 is energized, and when a right hand movement of the shaft 10 occurs, the clutch 19 is energized.

The double sided member 20 of the clutches 18—19 is keyed to the shaft 22. Constant drive is applied to the driving elements of these clutches by intermediate gearing from a counter-shaft 23 which is driven by a belt on a pulley 24. One of these gears, 25—26, is a direct drive gear and the other 27—27'—28 is a reverse drive gear. The arrangement of this reversing drive is seen in Figs. 1 and 5. When the arm 17 of the switch shown in Fig. 4 is moved to the right and closes the circuit at 59—61, the clutch 19 is energized and direct drive is then applied through the shaft 23 and gears 25—26 to the shaft 22. When the arm 17 is moved to the left, and closes the circuit at 58—60, the clutch 18 is energized and reverse drive is applied to the shaft 22 through the shaft 23 and gears 27—27'—28. Rotation of the counter-shaft 23 therefore causes the shaft 22 to turn positively or negatively, according to which clutch 18 or 19 is energized for the time being.

The shaft 22 is normally held against rotation by a brake shoe 72 (Fig. 3). This shoe is carried on the end of a rocking beam 73 and the rocking beam is movable by means of a rocking armature 74 associated with an electro-magnet 75. 76 is a spring which holds the beam 73 under tension, keeping the brake shoe 72 normally in contact with its drum 77. When current passes, consequent upon the closing of either of the contacts 60—61, the magnet 75 is energized and the brake shoe 72 is retired, permitting the shaft 22 to turn.

The movement of the shaft 22 is transmitted through a pinion 29 to a spur wheel 30 on a jack shaft 31, and through a pinion 32 on that shaft and a spur wheel 33 to a counter-shaft 34 on which a drum 41 is fixed. A flexible tape 8 on this drum actuates a local indicator (not shown) and it is moved by the gearing in correspondence with the movement of the tape 95. Movement of the shaft 22 is also transmitted through spur wheels 37—38 to the spindle 39 of a self-synchronizing motor 40. This is the main control motor. All the distant self-synchronizing motors in the circuit of the motor 40, and all the indicators associated therewith are thus operated in synchronism with the indicator at the central control station.

Simultaneously with the closing of the clutch circuit, the clutch drive is applied through the shaft 34 and a pinion 35 to a gear wheel 36 which is fixed to the sun wheel 14 of the epicyclic gear box 16. The sun wheel 14 is thus set in motion by the clutch drive and driven in a direction opposite to that of the wheel 13, so that the angular movement of the arm 17 almost ceases. If the sun wheels 13 and 14 are both driven for a time at the same speed, the rotor 15, shaft 10 and arm 17 will remain stationary, and the clutch circuit will remain closed. If the tape 95 causes the wheel 13 to move faster than the wheel 14, the shaft 10 and arm 17 will move ahead slightly, but the gearing is so proportioned that the arm 17 does not at any time move far from the vertical position shown in Fig. 4. When the movement of the wheel 13 is slower than that of the wheel 14, the reverse movement of the wheel 14 causes the rotor 15 and the shaft 10 to rotate in the reverse direction, thus bringing the arm 17 back to the vertical position shown in Fig. 4. When the arm 17 is moving back to the vertical position, the cam head 50 contacts with one or other of the tappets 51—52 thereby tilting the rocking member 53 on its centre 54, opening the circuit at 60 or 61 and re-setting the ball latch in the centre notch in the latch plate 70. Immediately contact is broken at 60 or 61 as the case may be, the circuit through the clutch 18 or 19 is broken, and at the same time the magnet 75 is de-energized. When the magnet 75 is de-energized the spring 76 immediately brings the brake shoe 72 into contact with the drum 77 and arrests the rotational movement of the shaft 22 and of the wheel 14. If the tape 95 and wheel 13 are still moving when the circuit is thus interrupted, the rotor 15 will commence to move relatively to the stationary wheel 14, and the clutch circuit will be immediately re-established by the movement of the arm 17. When the movement of the tape 95 ceases, the circuit is opened in the manner previously described and it will remain open until a further movement of the tape 95 takes place.

What we claim as our invention and desire to secure by Letters Patent is:—

1. In apparatus of the type herein described wherein ratio variations are represented by to-and-fro linear movements of a flexible line, a shaft, a differential gear train on said shaft, a counterweighted pulley fixed to one sun wheel of said train, means for rotating said pulley in correspondence with said to-and-fro linear movements, a constantly rotating member, means including two electromagnetic clutches for applying positive and negative rotation respectively from said constantly rotating member to a Selsyn motor and to the other sun wheel of said differential gear train, a tappet arm fixed to the shaft of said train, a reversing switch operable by said tappet arm, said switch comprising a rocking member having a tappet roller on each side of its pivot in the path of movement of said arm, a spring plate mounted on said rocking member and carrying a striker head, a latch on the to end of said head and a spring latch lever coacting with said latch to restrain the head in erect position or in either tilted position, contact members carried by but insulated from said head, a flexible contact member mounted on a fixed plate at each side of said head, an electric circuit through one pair of contacts to one of said electro-magnetic clutches, an electric circuit through the other pair of contacts to the other of said magnetic clutches, the contacts on said head having clearance from the flexible contact members when said tappet arm is at neutral position with said head latched in the centre position.

2. In apparatus as claimed in claim 1, a brake drum on the clutch shaft, and a spring loaded electromagnetically releasable brake coacting with said drum.

GEORGE ALFRED JULIUS.
AWDRY FRANCIS JULIUS.